(12) United States Patent
Brixius et al.

(10) Patent No.: US 7,025,195 B2
(45) Date of Patent: Apr. 11, 2006

(54) CONVEYOR SYSTEM FOR TRANSPORT OF CONTAINERS

(75) Inventors: Wolfgang Brixius, Neunkirchen A. Br. (DE); Dominik Gräfer, Dortmund-Wellinghofen (DE); Albrecht Hoene, Lappersdorf (DE)

(73) Assignee: Siemens Aktiengesellschaft, München (DE)

( * ) Notice: Subject to any disclaimer, the term of this patent is extended or adjusted under 35 U.S.C. 154(b) by 33 days.

(21) Appl. No.: 10/789,196

(22) Filed: Feb. 27, 2004

(65) Prior Publication Data

US 2004/0168893 A1 Sep. 2, 2004

(30) Foreign Application Priority Data

Feb. 27, 2003 (DE) ................. 103 08 657
Apr. 4, 2003 (DE) ................. 103 15 404

(51) Int. Cl.
*B65G 13/02* (2006.01)
(52) U.S. Cl. .............. 198/787; 198/611; 198/692; 198/346.1; 198/346.2; 198/468.1
(58) Field of Classification Search ............. 198/787, 198/611, 642, 346.1, 346.2, 468.1
See application file for complete search history.

(56) References Cited

U.S. PATENT DOCUMENTS 3,507,379 A * 4/1970 Johnston ............... 198/787
4,043,445 A * 8/1977 Wirth et al. ............ 198/611
5,544,733 A * 8/1996 Shaver .................. 198/408
6,273,241 B1* 8/2001 Bonnet .................. 198/790
6,601,697 B1* 8/2003 Steeber et al. .......... 198/844.1
6,761,264 B1* 7/2004 Steeber et al. .......... 198/844.1

FOREIGN PATENT DOCUMENTS

| DE | 40 35 128 A1 | 6/1992 |
| DE | 42 20 117 A1 | 2/1993 |
| DE | 41 41 426 A1 | 6/1993 |
| DE | 42 10 387 A1 | 10/1993 |
| DE | 195 11 912 A1 | 10/1996 |
| DE | 197 21 726 C1 | 7/1998 |
| DE | 101 16 882 A1 | 10/2002 |
| DE | 20213326 U1 | 3/2003 |
| EP | 806 384 A2 | 11/1997 |
| EP | 1 094 018 A1 | 4/2001 |

* cited by examiner

*Primary Examiner*—Joe Dillon, Jr.
(74) *Attorney, Agent, or Firm*—Henry M. Feiereisen

(57) ABSTRACT

A conveyor system for transport of containers, in particular an airport baggage handling system, includes a conveyor having a curved transport path with one end defining an entry zone and another end defining an exit zone. The containers are moved by a container propulsion mechanism along the curved transport path between the entry and exit zones, wherein the curved transport path is constructed for movement of the containers in an inwardly inclined disposition for reducing centrifugal forces.

17 Claims, 4 Drawing Sheets

_US 7,025,195 B2_

CONVEYOR SYSTEM FOR TRANSPORT OF CONTAINERS

CROSS-REFERENCES TO RELATED APPLICATIONS

This application claims the priorities of German Patent Applications, Ser. Nos. 103 08 657.9, filed Feb. 27, 2003, and 103 15 404.3, filed Apr. 4, 2003, pursuant to 35 U.S.C. 119(a)-(d), the disclosure of which is incorporated herein by reference.

BACKGROUND OF THE INVENTION

The present invention relates to a conveyor system for transport of containers, in particular to an airport baggage handling system.

Airport baggage handling systems typically involve a conveyor system having at least one curved conveyor to define a curved transport path. The curved conveyor has one end to define a container entry zone and another end to define a container exit zone, whereby the containers are moved along the transport path by a propulsion drive. Typically, the propulsion drive includes a conveyor belt for support of a side edge of the containers. Conventional baggage handling systems suffer shortcomings because the content accommodated by the container, e.g. bulk material or baggage item, shifts so that the position within the container changes.

It would therefore be desirable and advantageous to provide an improved conveyor system to obviate prior art shortcomings and to maintain a position of the content in the container when negotiating a curved transport path, even when the content rests only upon the container bottom.

SUMMARY OF THE INVENTION

According to one aspect of the present invention, a conveyor system for transport of containers, in particular an airport baggage handling system, includes a conveyor having a curved transport path with one end defining an entry zone and another end defining an exit zone, and a container propulsion mechanism for moving a container along the curved transport path between the entry and exit zones, wherein the curved transport path is constructed for movement of the container in an inwardly inclined disposition for reducing centrifugal forces.

The present invention resolves prior art problems by inclining the container during its advance through the curved transport path. The inclination is hereby so selected as to prevent a shift of the content in the container.

According to another feature of the present invention, the curved transport path is constructed for movement of the container in a manner that an outer side of the container is elevated in relation to an inner side of the container.

According to another feature of the present invention, the conveyor may have a carriage guided on an outer guide rail of the conveyor for lifting the container. This construction realizes a reliable elevation of the container. Suitably, the carriage is detachably connected to the container, when the container enters the entry zone, for conjoint movement of the carriage and the container along the curved transport path by the container propulsion mechanism, and detached from the container, when the container reaches the exit zone. This type of coupling between the carriage and the container can be realized in a simple manner by providing the container with a recess for engagement by the carriage.

According to another feature of the present invention, a return mechanism is provided for moving the carriage back to the entry zone. In this way, a continuous movement of the carriage is ensured in a simple manner. The return mechanism may include a guide rail, which is disposed below the transport path and receives the carriage at the exit zone, and a positioning element for moving the carriage upwards to the entry zone. Suitably, the guide rail is arranged in slanted disposition to allow the carriage to spontaneously roll back to the entry zone by its own weight.

According to another feature of the present invention, the positioning element may be configured in the form of a wheel for moving the carriage upwards about its outer circumference and realizing a form-fitting engagement with the container. The wheel is hereby designed like a miniaturized Ferris wheel with suspended gondolas. As an alternative, lifting of the container may also be implemented by constructing the conveyor with two rails which are disposed at an elevation sufficient to lift the container and which support the outer side of the container. Suitably, each of the rails is constructed as sliding rail so that the need for auxiliary means is eliminated.

According to another feature of the present invention, the rails may be constructed to form staggered ramps in the entry zone and staggered ramps in the exit zone for lifting the outer side of the container in the entry zone to rail level and for lowering the outer side of the container in the exit zone to a horizontal disposition. The provision of staggered ramps prevents an inadvertent tilting of the container and realizes a parallel elevation of the outer container side. Suitably, the ramps are staggered in transport direction by about a container length.

According to another feature of the present invention, the container has a bottom side which rests on the rails. As an alternative, the container may have an outwardly directed projection for support on the rails.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
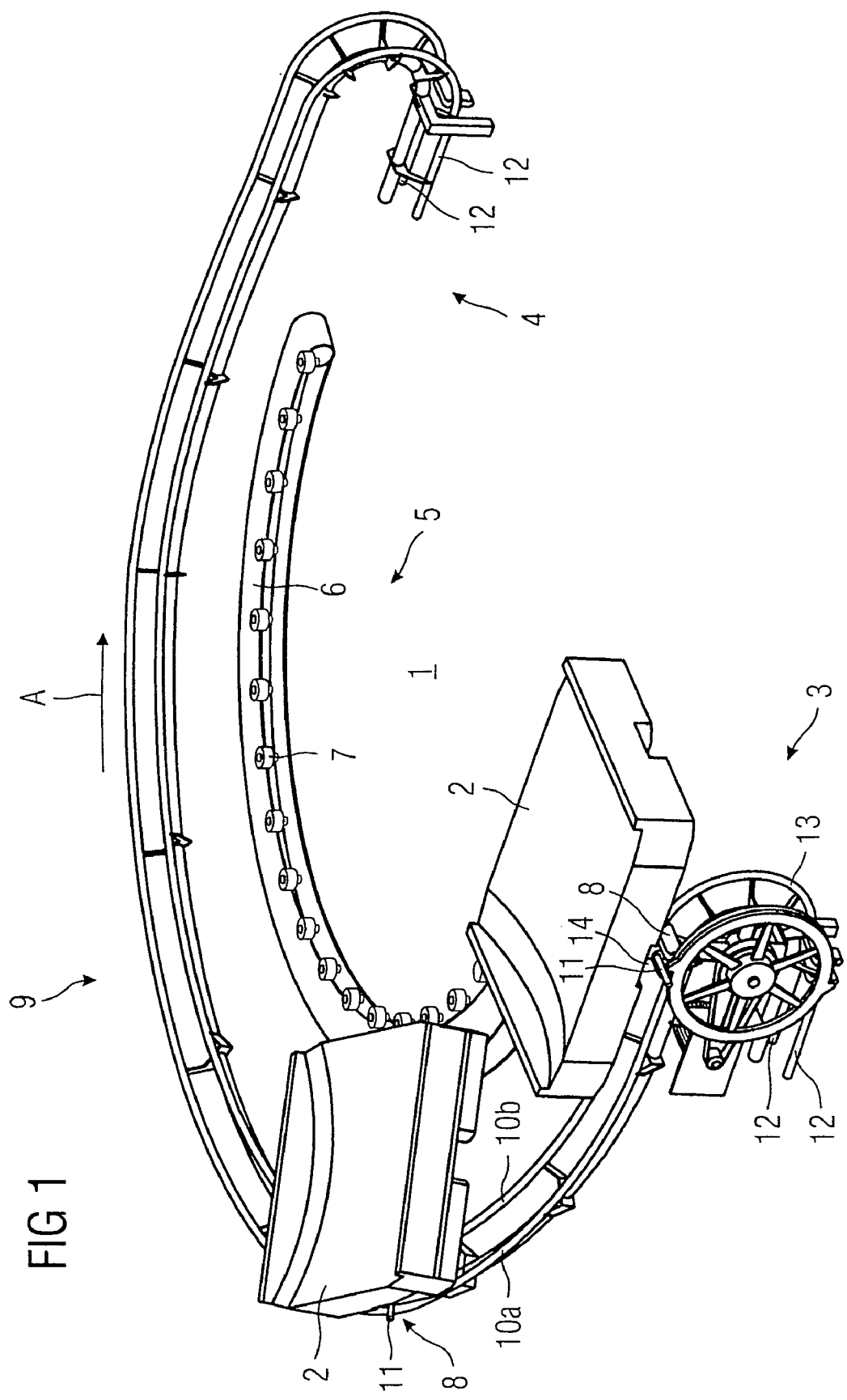
FIG. 1 is a perspective illustration of one embodiment of a curved conveyor according to the present invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a perspective illustration of one embodiment of a curved conveyor according to the present invention, generally designated by reference numeral 1 and forming part of a conveyor system for transport of containers 2 for item pieces or also bulk material in a direction indicated by arrow A. The conveyor 1 is curved to define a curved transport path with one end defining a container entry zone 3 and another end defining a container exit zone 4. The containers 2 are moved along the transport path by a container propulsion device, generally designated by reference numeral 5 and including a conveyor belt 6 which is operated by a motor (not shown) and intended for support of one side of the containers 2 (in FIG. 1, the right-hand side). The conveyor belt 6 is hereby curved in conformity of the curved configuration of the transport path. The containers 2 are guided by the conveyor belt 6 via freely rotatable guide rollers 7 which are arranged on the inside of the curved conveyor belt 6. The other side of the containers 2 is supported via a carriage 8 on a rail construction, generally designated by reference numeral 9 and including two guide rails 10a, 10b in parallel relationship.

The rail construction 9 is arranged at an elevated relationship to the conveyor belt 6 so that the containers 2 are inwardly tilted in the curved transport path. To realize a three-point support, each container 2 is supported on the inner side upon the conveyor belt 6 and on the outer side upon a support bar 11 which is secured to the carriage 8.

When reaching the exit zone 4, the form-fitting connection between the carriage 8 and the respective container 2 is released and the carriage 8 moves downwards. Subsequently, the carriage 8 is returned to the entry zone 3 by means of further guide rails 12 which are arranged below the conveyor belt 6 and thus below the transport path. FIG. 1 shows only small portions of the guide rails 12 for ease of illustration and clarity. Of course, the guide rails 12 extend to the entry zone 3. In a direction toward the entry zone 3, the guide rails 12 are inclined or oblique so as to allow the carriages 8 to spontaneously roll back to the entry zone 3 by their own weight. The guide rails 12 thus act as carriage return mechanism. Of course, the return of the carriages 8 from the exit zone 4 to the entry zone 3 may also be realized in a different way, for example by means of a friction belt.

Arranged in the entry zone 3 is a positioning element 13 by which the carriages 8 are moved upwards below a ready container 2 for form-fitting engagement of the carriage 8 with the container 2.

Figure 2:
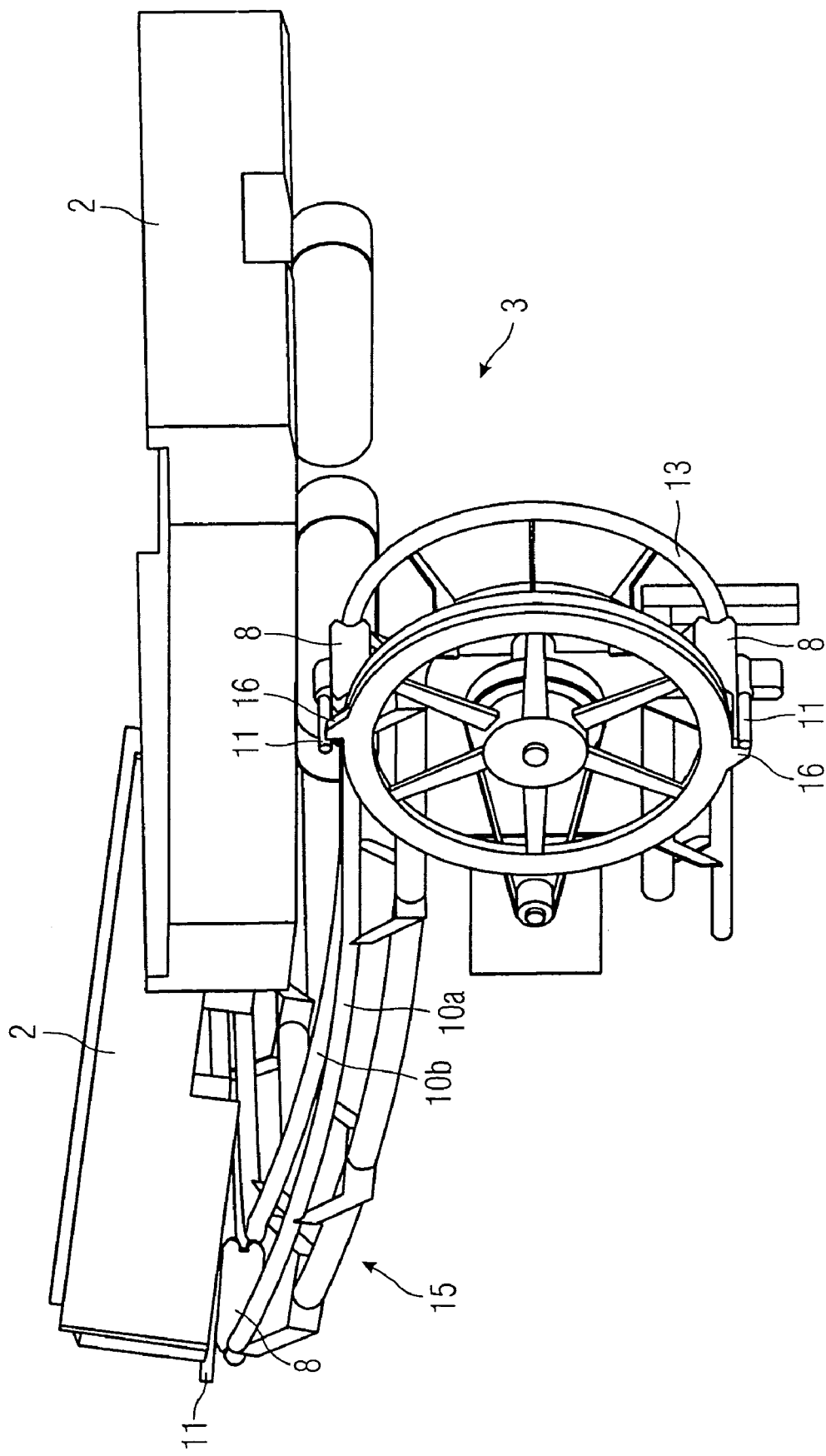
FIG. 2 is a perspective cutaway view, on an enlarged scale, of the conveyor of FIG. 1, illustrating in detail the container entry zone.

Turning now to FIG. 2, there is shown a perspective cutaway view, on an enlarged scale, of the conveyor 1 of FIG. 1, to illustrate the positioning element 13 and two containers 2 in more detail and from a different viewing direction. The positioning element 12 is configured as wheel resembling a miniaturized Ferris wheel, whereby the carriages 8 are attached about the outer circumference of the wheel like suspended gondolas of a Ferris wheel and moved upwards. When reaching the apex of the wheel, the carriage 8 is detachably secured to the containers 2 by engaging a recess 14 (FIG. 1) of the container 2, and then moved together with the advancing container 2. In the entry zone 3, the outer side of the rail construction 9 is provided with an ascent 15 to elevate the outer side of the container 2 in relation to the inner side of the container 2.

The containers 2 supplied to the entry zone 3 may be queued up, and the container 2 can be moved by a catch 16 to the pick-up position for detachable connection with the carriage 8. In this position, the upper part of the carriage 8 is received in the recess 14 in the bottom of the container 2, with the recess 14 situated approximately in mid-section of the container length side. Form this position on, the carriage 8 is freely movable along the transport path.

Instead of the guide rollers 7, the propulsion device 5 may be supported by a driven vertical belt which travels at a same speed and in a same direction as the conveyor belt 6. The container propulsion device 6 may be realized by frictional engagement or form-fitting engagement (not shown).

Figure 3:
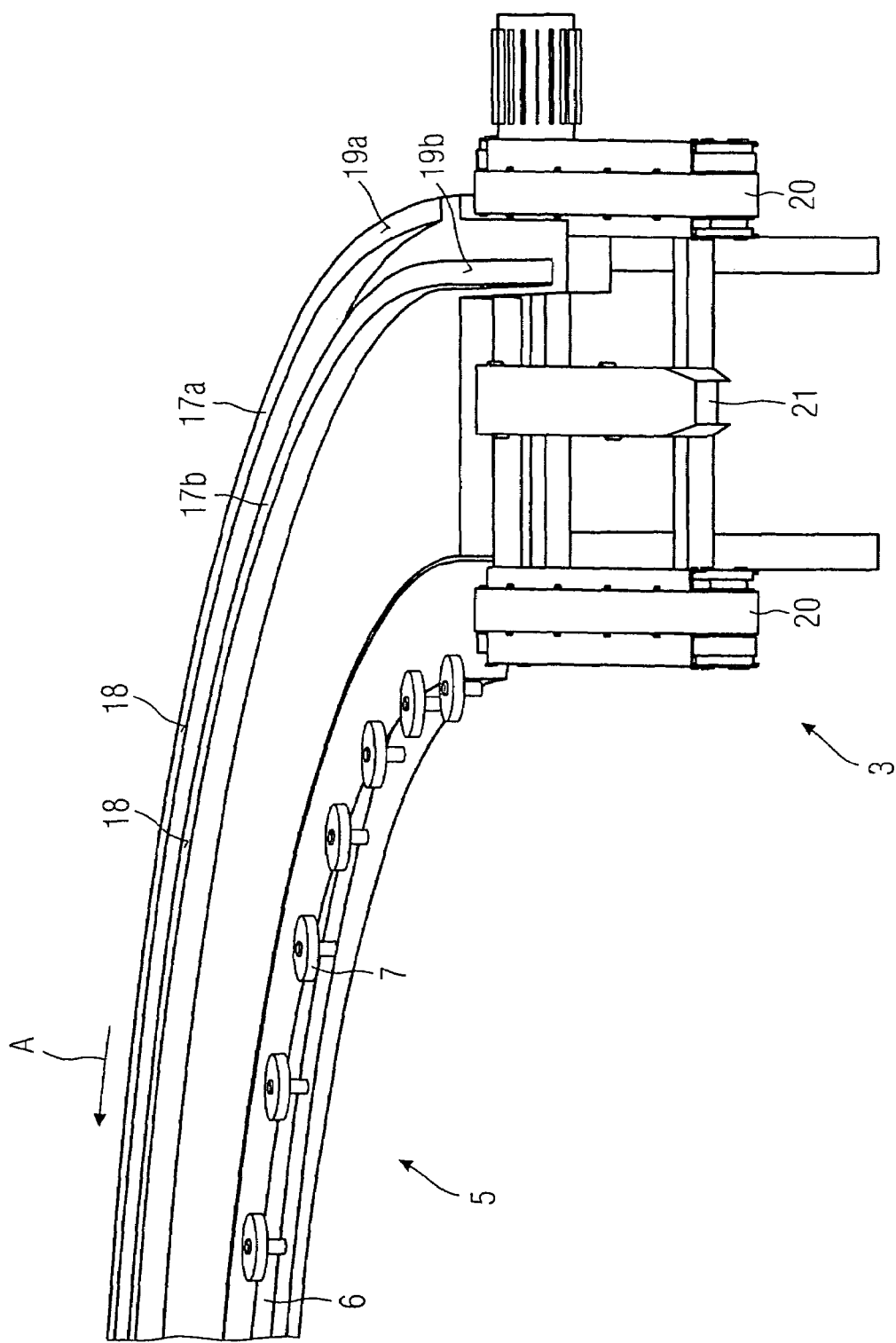
FIG. 3 is a fragmentary perspective illustration of another embodiment a curved conveyor according to the present invention.

Referring now to FIG. 3, there is shown a fragmentary perspective illustration of another embodiment of a curved conveyor according to the present invention. Parts corresponding with those in FIG. 1 are denoted by identical reference numerals and not explained again. The description below will center on the differences between the embodiments. In this embodiment, provision is made for two rails, an outer rail 17a and an inner rail 17b, for lifting the outer side of the containers 2. The rails 17a, 17b are configured as sliding rails and have each a support surface 18 situated above the conveyor belt 6. In the entry zone 3 of the transport path, the rails 17a, 17b have ends which are staggered in transport direction A to define ramps 19a, 19b, whereby the ramp 19b of the inner rail 17b begins ahead of the ramp 19a of the outer rail 17a, as viewed in transport direction A.

Transfer of the containers 2 into the entry zone 3 is realized by two conveyor belts 20 whereby the conveyor belt 6 receives the containers 2 from the conveyor belts 20 in lying disposition. Suitably, the containers 2 are properly guided by a profiled guide member 21.

Figure 4:
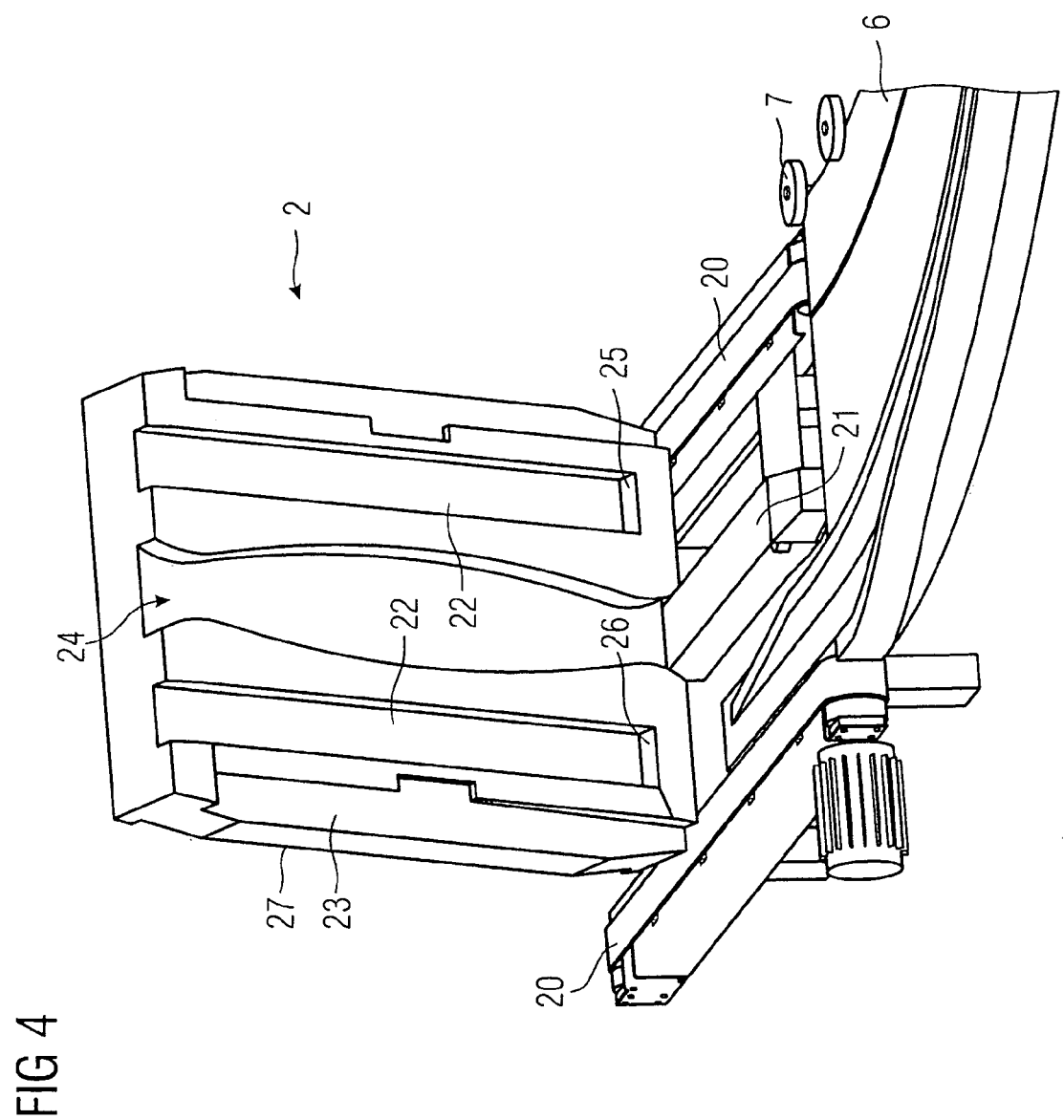
FIG. 4 is a perspective cutaway view of the conveyor of FIG. 3, illustrating the container in upright position form a different viewing direction.

FIG. 4 shows in more detail the entry zone 3 of the conveyor of FIG. 3 from a different perspective, whereby the container 2 is positioned upright for ease of understanding and to show the bottom underside of the container 2. As can be seen in FIG. 4, the bottom underside of the container 2 has grooves 22, 23, 24 as well as shoulders 25, 26, whereby the grooves 22, 23, 24 and the shoulders 25, 26, are so configured as to allow an even elevation of the container on the outer side. In other words, the outer edge 27 of the container 2 extends horizontal. The guide member 21 hereby engages the groove 24 during transfer from the conveyor belts 20 to the conveyor belt 6.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A conveyor system for transport of containers, in particular an airport baggage handling system, comprising:
   a conveyor having a curved transport path with one end defining an entry zone and another end defining an exit zone; and
   a container propulsion mechanism for moving a container along the curved transport path between the entry and exit zones,
   wherein the curved transport path is constructed for movement of the container in an inwardly inclined disposition for reducing centrifugal forces, and wherein the conveyor has a carriage guided on an outer guide rail of the conveyor for lifting the container.

2. The conveyor system of claim 1, wherein the container is lifted by the carriage in a manner that an outer side of the container is elevated in relation to an inner side of the container.

3. The conveyor system of claim 1, wherein the carriage engages a recess of the container.

4. The conveyor system of claim 1, and further comprising coupling means for detachably connecting the carriage to the container, when the container enters the entry zone, for conjoint movement of the carriage and the container along the curved transport path by the container propulsion mechanism, said coupling means being constructed for detachment of the carriage from the container, when the container reaches the exit zone.

5. The conveyor system of claim 4, wherein the coupling means includes a catch provided on the carriage and a recess formed in a bottom underside of the container.

6. The conveyor system of claim 1, and further comprising a return mechanism for moving the carriage back to the entry zone.

7. The conveyor system of claim 6, wherein the return mechanism includes a guide rail, which is disposed below the transport path and receives the carriage at the exit zone, and a positioning element for moving the carriage upwards to the entry zone.

8. The conveyor system of claim 7, wherein the guide rail is arranged in slanted disposition to allow the carriage to spontaneously roll back to the entry zone by its own weight.

9. The conveyor system of claim 7, wherein the positioning element is configured in the form of a wheel for moving the carriage upwards about its outer circumference and realizing a form-fitting engagement with the container.

10. A conveyor system for transport of containers, in particular an airport baggage handling system, comprising:
a conveyor having a curved transport path with one end defining an entry zone and another end defining an exit zone; and
a container propulsion mechanism for moving a container along the curved transport path between the entry and exit zones,
wherein the curved transport path is constructed for movement of the container in an inwardly inclined disposition for reducing centrifugal forces,
wherein the conveyor includes two rails disposed at an elevation sufficient to lift the container and supporting an outer side of the container.

11. The conveyor system of claim 10, wherein the container has a bottom side resting on the rails.

12. The conveyor system of claim 10, wherein the container has an outwardly directed projection for support on the rails.

13. The conveyor system of claim 10, wherein each of the rails is constructed as sliding rail.

14. The conveyor system of claim 10, wherein the rails are constructed to form ramps in the entry zone and ramps in the exit zone for lifting the outer side of the container in the entry zone to rail level and for lowering the outer side of the container in the exit zone to a horizontal disposition.

15. The conveyor system of claim 14, wherein the ramps in the entry zone are staggered, and the ramps in the exit zone are staggered.

16. The conveyor system of claim 15, wherein the rails are constructed in the entry and exit zones in such a manner that in transport direction of the container an outer one of the two rails is shorter than an inner one of the two rails to form the staggered ramps.

17. The conveyor system of claim 16, wherein the ramps are staggered in transport direction by about a container length.

* * * * *